Figure 1:
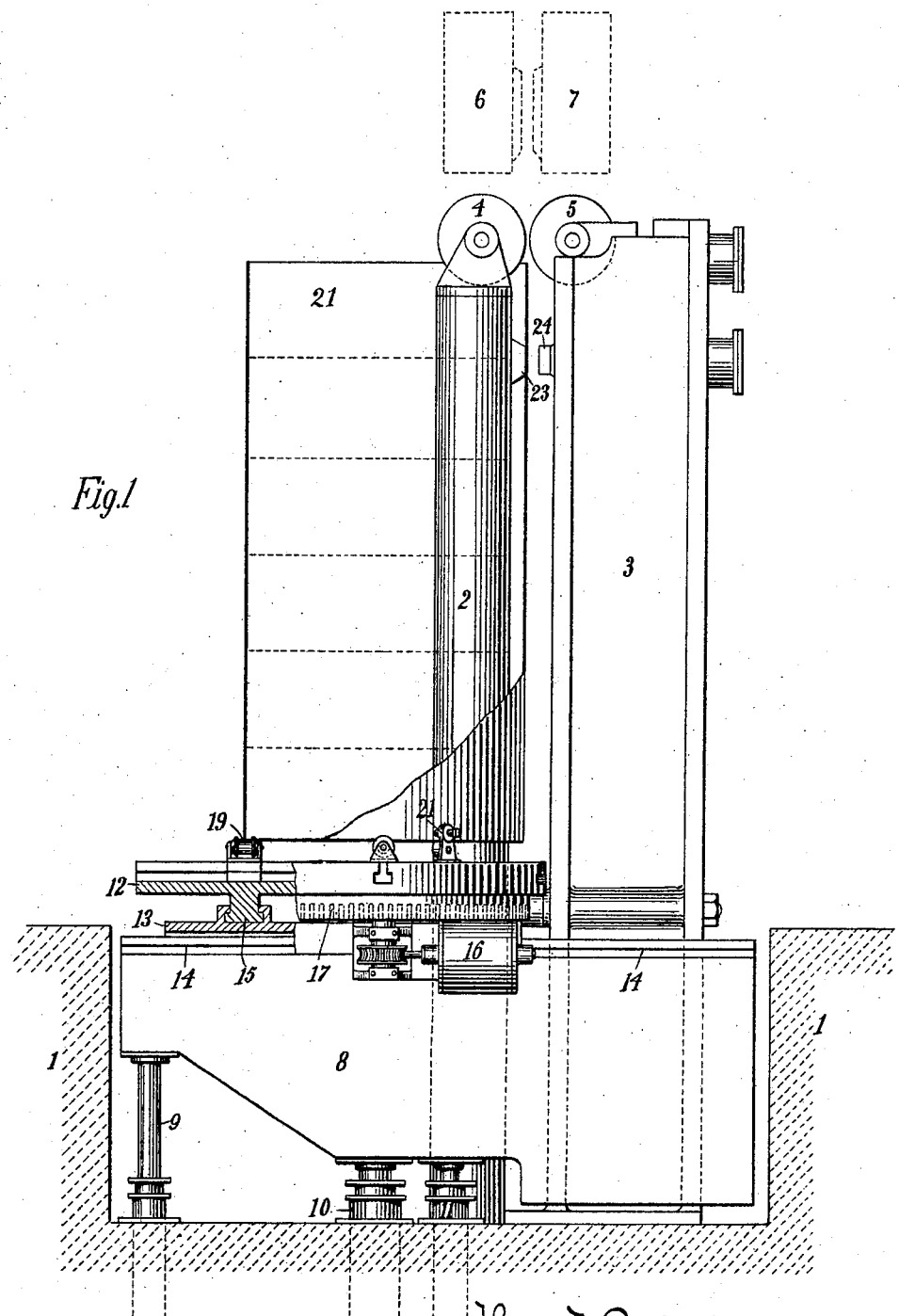

No. 682,640. Patented Sept. 17, 1901.
T. F. ROWLAND.
WELDING MACHINE.
(Application filed Jan. 3, 1901.)
(No Model.) 3 Sheets—Sheet 1.

Witnesses: Thomas F. Rowland, Inventor
by Frederick S. Duncan, Att'y

No. 682,640.

T. F. ROWLAND.
WELDING MACHINE.
(Application filed Jan. 3, 1901.)

Patented Sept. 17, 1901.

(No Model.)

3 Sheets—Sheet 2.

Fig. 2

Witnesses:
Raphael Petter
James N. Catlow

Thomas F. Rowland, Inventor,
by Frederick S. Duncan, Att'y.

No. 682,640. Patented Sept. 17, 1901.
T. F. ROWLAND.
WELDING MACHINE.
(Application filed Jan. 3, 1901.)
(No Model.) 3 Sheets—Sheet 3.

Witnesses: Thomas F. Rowland, Inventor,
by Frederick S. Duncan, Att'y.

UNITED STATES PATENT OFFICE.

THOMAS F. ROWLAND, OF NEW YORK, N. Y.

WELDING-MACHINE.

SPECIFICATION forming part of Letters Patent No. 682,640, dated September 17, 1901.

Application filed January 3, 1901. Serial No. 41,934. (No model.)

*To all whom it may concern:*

Be it known that I, THOMAS F. ROWLAND, a citizen of the United States, residing in the borough of Manhattan, city of New York, county of New York, and State of New York, have invented certain new and useful Improvements in Welding-Machines, of which the following is a specification, reference being had to the drawings accompanying and forming a part of the same.

The present invention relates to the improvements of that class of cylinder welding-machines shown by my United States Letters Patent No. 412,122, dated October 1, 1889, United States Letters Patent to T. F. Rowland, Jr., No. 468,009, dated February 2, 1892, and my United States Patent No. 547,940, dated October 5, 1895. Such of my inventions as are shown herein but not claimed are claimed in my copending application, Serial No. 60,190, filed May 14, 1901. Said patents show and describe a mechanism for welding the longitudinal seam of a plate-metal cylinder. This mechanism consists of two rigidly-sustained and practically parallel vertical arms, which are fixed at their lower ends and are free at their upper ends. At the upper ends said arms carry welding-rolls, one of which is movable relatively to the other. The cylinder to be welded is placed over and around one of said upright arms and rests upon a table which is arranged to be vertically moved up and down the arm surrounded by said cylinder. The table is also arranged to be horizontally adjusted and is capable of a limited angular motion. In connection with this mechanism a furnace is shown by which the edges of the blank from which the cylinder is to be formed are heated.

The objects of my present improvements are, first, to provide a mechanism capable of welding a cylinder of much smaller diameter than could be treated by any prior mechanism; next, to provide mechanism whereby two cylinders can be cheaply and efficiently welded together circumferentially, and to provide means whereby the welding of both the longitudinal and circumferential seams can be more efficiently and satisfactorily accomplished than heretofore.

I accomplish these objects by the mechanism illustrated in the accompanying drawings, in which—

Figure 3:
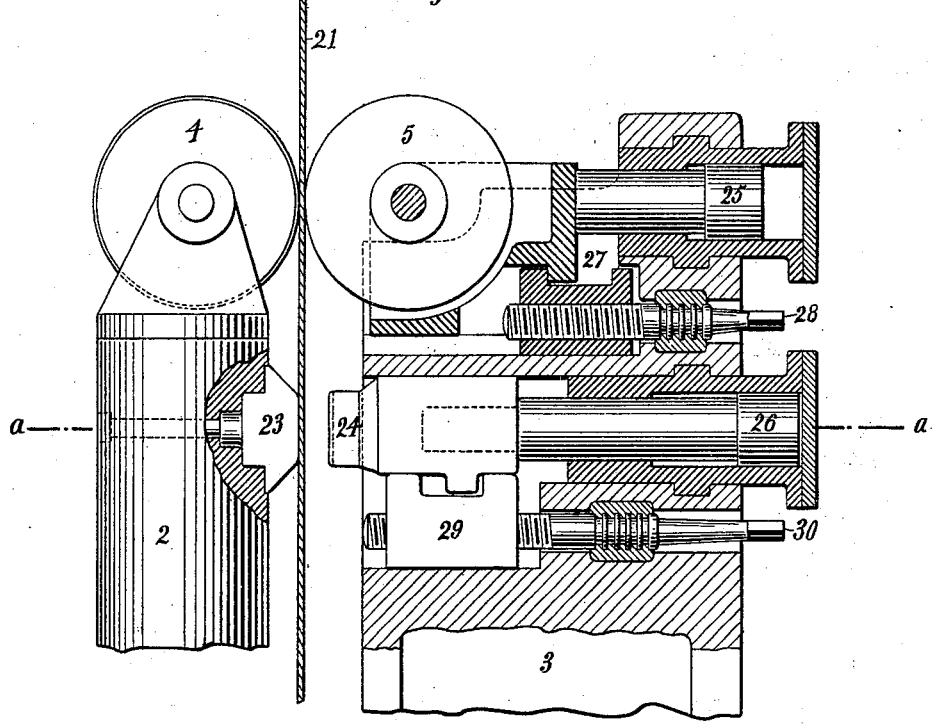

Figure 1 is an elevation view of the welding-machine containing my improvements; Fig. 2, an enlarged plan view of the same; Fig. 3, an enlarged view of the upper or free ends of the parallel arms which carry the welding mechanism, portions thereof being shown in central vertical section; and Fig. 4, a cross or horizontal section of the parts of Fig. 3 on the line $a$ $a$.

Referring to the drawings in detail, the numeral 1 represents the general foundation of the machine. 2 and 3 are the parallel vertical arms of the mechanism, which carry at their upper or free ends the welding-rolls 4 and 5. The roll 4 is fixedly journaled on the arm 2, while the roll 5 is journaled in the movable mechanism carried by the arm 3, which mechanism is of the kind and character illustrated and described in my Patent No. 547,940. 6 and 7 represent furnaces of any proper construction and operation, preferably located just above the said welding-rolls, so as to receive and heat the cylinder-blank to be operated on.

8 indicates a carriage which engages the arm 3 and is vertically adjustable thereon, the arm 2 being free from the carriage 8 and projecting upward through an opening in the said carriage. The vertical adjustment of this carriage is accomplished by hydraulic rams 10 and 11 and by an auxiliary ram 9, the function of which auxiliary ram will be later described. It is to be noted that the cylinder-blank which rests upon the carriage 8 surrounds the arm 2, whereas the carriage itself engages with the arm 3. While the arm 3 in order to support the weight of the carriage must be of considerable size and strength, the arm 2 being free from the carriage and being subject to no strain except that of the welding pressure may be made of much smaller dimensions than the carriage-carrying arm. On the carriage 8 is mounted the blank-carrying table 12, which is connected with the carriage in accordance with the construction shown in the aforesaid Patent No. 468,009. The table is thus adjustable to and from the arm 2 and is capable of a limited circular adjustment thereto through the medium of the slide-frame 13, moving on ways 14 on the carriage, which frame has the circular ways 15, engaging and supporting the table. The circular movement of the table is preferably effected by a motor mechanism 16, affixed to the slide-frame and engaging a rack 17 on the table. The said table 12 is provided with radial slots 18, in which run blocks or slides carrying the blank-sustaining rolls 19. This table is also provided with slots 20, in which are movably held the blank-clamping devices 21. The blank to be operated upon is represented by 22, shown in Figs. 1 and 2 as supported by the rolls 19 and held clamped to the table 12 by said clamping device 21.

Figure 4:
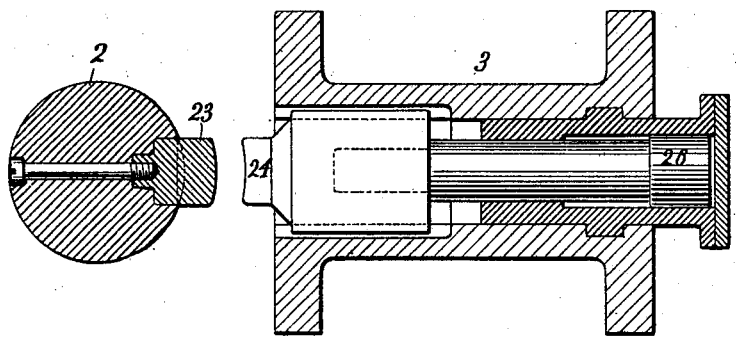

Referring particularly to Figs. 3 and 4, 23 indicates an anvil removably carried on the arm 2, and 24 represents a welding-hammer or pressure device carried on the arm 3 and operating in conjunction with the anvil 23. 25 is a differential piston acted upon by suitable hydraulic pressure (especially as set forth in the said Patent No. 547,940) for the purpose of moving the welding-roll 5 to and from the welding-roll 4. 26 represents a similarly-operated piston which actuates the hammer or pressure device 24, these pistons being provided with regulating devices 27, 28, 29, and 30, operating as explained in said Patent No. 547,940. A suitably-shaped anvil and hammer should be used for forming the circumferential weld; but rolls may be used for the longitudinal weld.

The operation of this welding-machine is as follows: Two cylindrical blank-sections are mounted upon a table one above the other and properly held in relative position preliminary to being welded together to produce a cylindrical structure. The table is then moved to bring a portion of the circumferential seam to a position where the furnaces can act upon the same, and then such portion of the seam is brought between the anvil and hammer or pressure device and pressed or welded together. The welding of this circumferential seam results in the greater or less distortion of the parts of the two cylinder-blanks immediately adjacent said seam. In order to correct this distortion and to bring the portions near the seam into the true cylindrical form, such portions are by the action of the table brought between the vertical welding-rolls and carried back and forth between said rolls while the pressure is applied. By welding together portions of the circumferential seam and then bringing the vertical rolls to bear upon such portions the circumferential seam is thus progressively completed and the cylinder is caused to retain its true form. By placing the vertical and the horizontal welding devices close to each other and in the same vertical plane the horizontal welding and the correction of the resulting distortion may be accomplished almost as a single action.

As the table itself is capable only of a limited range of angular movement I have arranged in my present device that the blank should rest upon sustaining-rolls 19. By movement of the blocks or slides, which carry these rolls along the radial slots 18, the rolls may be arranged to receive any desirable size of cylindrical blank. When the cylindrical blank is in position to be welded, the clamps 21 are brought into engagement with the blank, holding it firmly upon the rollers. When the table has made its fullest range of angular movement, the welding-rolls or the circumferential-welding pressure device, or both, are closed upon the blank, the clamps 21 are released, and the table is partially turned in the opposite direction of its previous movement. When the blank is resecured to the table in the manner above described, angular movement of the table will present new portions of the circumferential seam of the blank to the welding devices. If desired, however, the rolls 19 may be omitted and the blank may rest upon the table or in the clamps. In this case when the table has reached its limit of angular motion the blank is clamped in the welding devices, the table is lowered, partially turned, and then raised again to support the blank, and the blank is then released from the welding devices.

By reason of the fact that the carriage is mounted upon and runs on the outer arm 3 of the machine and that the inner arm 2 may therefore be of comparatively small diameter it is possible in my device to treat cylindrical blanks of comparatively small diameter, welding them either longitudinally or circumferentially. In prior machines, where the carriage was mounted on the same arm which was surrounded by the cylindrical blank, it was necessary to make such inner arm so large and strong that the welding of comparatively small cylinders could not be accomplished. Whatever yielding the comparatively small inner arm of my present device may have will be readily compensated for by the adjustment of the movable welding member. By locating the fixed welding devices in the inner arm and the movable welding mechanism in the large outer arm the inner arm may be kept of a comparatively small diameter and without any projecting movable parts, such as are necessary to the movable welding mechanism.

The auxiliary ram 9 is located near that end of the carriage on which is situated the table. When a comparatively small cylinder is being treated upon the table, the main rams 10 and 11 will be sufficient not only to raise and lower the carriage and its load, but also to keep the same in balance. When, however, a large cylinder is placed upon the table, it will be desirable to use the ram 9, not only for the purpose of assisting in elevating and lowering the carriage, but also and more particularly for keeping the carriage in balance, so that the blank will always be in a vertical position when brought between the welding devices.

It is to be noted that whereas the welding-rolls are, as expressed in the prior patents above referred to, used to effect longitudinal welding, they are particularly effective in the present mechanism in conjunction with the circumferential-welding mechanism to correct distortion resulting from the action of the latter mechanism. Thus the latter mechanism is shaped and operated to produce a seam or weld running circumferentially, and the other welding mechanism is shaped and operated to act conjointly with the first upon such welded parts, so as to insure their final cylindrical form.

Having thus described my invention, what I claim as new, and desire to secure by Letters Patent, is—

1. In a welding mechanism, two vertical arms provided at their free ends with coöperating welding devices, a blank-carrying carriage movably mounted on one arm and vertically adjustable thereon and arranged to support and carry the blank around the other arm.

2. In a welding mechanism, two vertical arms provided at their free ends with coöperating welding devices adapted to weld a vertical seam and coacting welding devices adapted to weld a horizontal seam, and a vertically-adjustable blank-carrying carriage adapted to carry a blank between such welding devices.

3. In a welding mechanism, two vertical arms provided at their free ends with coacting welding devices adapted to weld a vertical seam and coacting welding devices adapted to weld a horizontal seam, and a blank-carrying carriage movably mounted on one arm and vertically adjustable thereon and adapted to carry a blank around the other arm and between the welding devices.

4. In a welding mechanism, two vertically-arranged arms provided at their free ends with coöperating welding devices, a carriage mounted on one of said arms and vertically adjustable thereon and adapted to carry a blank around the other arm, and a horizontally and circularly movable blank-carrying table mounted on said carriage.

5. In a welding mechanism, two vertically-arranged arms provided at their free ends with coacting welding devices adapted to weld a vertical seam and coacting welding devices adapted to weld a horizontal seam, a carriage mounted on one of said arms and vertically adjustable thereon and adapted to carry the blank around the other arm, and a horizontally and circularly movable blank-carrying table mounted on said carriage.

6. In a welding mechanism, two vertically-arranged arms provided at their free ends with coöperating welding devices, a carriage vertically adjustable relative to said arms and provided with radially-adjustable rotating blank-supporting mechanism and also provided with blank-locking mechanism, substantially as and for the purposes above set forth.

7. In a welding mechanism, two vertically-arranged arms provided at their free ends with coacting welding devices, a carriage movably mounted on one arm and vertically adjustable thereon, and arranged to support and carry the blank around the other arm, and provided with radially-adjustable rotating blank-supporting mechanism and also provided with blank-locking mechanism, substantially as and for the purposes above set forth.

8. In a welding mechanism, two vertically-arranged arms provided at their free ends with coacting welding devices adapted to weld a vertical seam and coacting welding devices adapted to weld a horizontal seam, a carriage movably mounted on one arm and vertically adjustable thereon and arranged to support and carry the blank around the other arm, and provided with radially-adjustable rotating blank-supporting mechanism and also provided with blank-locking mechanism, substantially as and for the purposes above set forth.

9. In a welding mechanism, two vertically-arranged arms provided at their free ends with coacting welding devices, a carriage vertically adjustable relative to said arms and provided with a horizontally and circularly movable blank-carrying table mounted on said carriage, which said table is provided with radially-adjustable rotating blank-supporting mechanism, and also provided with blank-locking mechanism, substantially as and for the purposes above set forth.

10. In a welding mechanism, two vertically-arranged arms provided at their free ends with coacting welding devices, a carriage movably mounted on one arm and vertically adjustable thereon and arranged to support and carry the blank around the other arm, and a horizontally and circularly movable blank-carrying table mounted on said carriage, which said table is provided with radially-adjustable rotating blank-supporting mechanism, and also provided with blank-locking mechanism, substantially as and for the purposes above set forth.

11. In a welding mechanism, two vertically-arranged arms provided at their free ends with coacting welding devices adapted to weld a vertical seam and coacting welding devices adapted to weld a horizontal seam, a carriage movably mounted on one arm and vertically adjustable thereon and arranged to support and carry the blank around the other arm, and a horizontally and circularly movable blank-carrying table mounted on said carriage, which said table is provided with radially-adjustable rotating blank-supporting mechanism, and also provided with blank-locking mechanism, substantially as and for the purposes above set forth.

12. In a welding mechanism, a vertical arm provided at its free end with fixed welding mechanism, a second vertical arm provided at its free end with movable welding mechanism coöperating with the fixed welding mechanism on the other arm, a blank-carrying carriage movably mounted and vertically adjustable on the second arm and adapted to carry the blank around the first arm.

13. In a welding mechanism, a vertical arm provided at its free end with a fixed welding mechanism adapted to weld a vertical seam and also provided with a fixed welding mechanism adapted to weld a horizontal seam, a second vertical arm provided at its free end with movable welding mechanism adapted to coöperate with the fixed welding mechanism on the other arm, a blank-carrying carriage movably mounted and vertically adjustable on the second arm and adapted to carry the blank around the first arm.

14. In a welding mechanism, a vertical arm provided at its free end with fixed welding mechanism adapted to weld a vertical seam and also provided with fixed welding mechanism adapted to weld a horizontal seam, a second vertical arm provided at its free end with movable welding mechanism adapted to coöperate with the fixed welding mechanism on the other arm, a blank-carrying carriage movably mounted and vertically adjustable on the second arm and adapted to carry the blank around the first arm, and a horizontally and circularly movable blank-carrying table mounted on said carriage.

15. In a welding mechanism, two vertical arms provided at their free ends with coöperating welding devices, a blank-carrying carriage movably mounted on one arm and vertically adjustable thereon, and arranged to support and carry the blank around the other arm, rams coacting with the body of said carriage to cause the vertical adjustment of the same, and an auxiliary ram located near the end of said carriage farthest from the arm on which it is mounted, substantially as and for the purposes above set forth.

16. In a welding mechanism, two vertical arms provided at their free ends with coacting welding devices adapted to weld a vertical seam and coacting welding devices adapted to weld a horizontal seam, a blank-carrying carriage movably mounted on one arm and vertically adjustable thereon and arranged to support and carry the blank around the other arm, rams coacting with the body of said carriage to cause the vertical adjustment of the same, and an auxiliary ram located near the end of said carriage farthest from the arm on which it is mounted, substantially as and for the purposes above set forth.

17. In a welding mechanism, the vertical arm 3 carrying at its upper end a welding-roll 5, the vertical arm 2 carrying at its upper end the welding-roll 4, the vertically-adjustable carriage 8 movably mounted on the arm 3, and the horizontally and circularly movable blank-carrying table 12 mounted on the carriage 8 whereby the blank is carried around the arm 2.

18. In a welding mechanism, the vertical arm 3 carrying at its upper end a welding-roll 5, the vertical arm 2 carrying at its upper end the welding-roll 4, the vertically-adjustable carriage 8 movably mounted on the arm 3, the horizontally and circularly movable blank-carrying table 12 mounted on the carriage 8, whereby the blank is carried around the arm 2, and radially-adjustable rotating blank-bearings 19, and blank-clamping devices 21.

19. In a welding mechanism, the vertical arm 3 carrying at its upper end an adjustable welding-roll 5 and an adjustable welding device 24, the vertical arm 2 carrying at its upper end the fixed welding-roll 4, and the fixed welding device 23, the vertically-adjustable carriage 8 movably mounted on the arm 3, and the horizontally and circularly movable blank-carrying table 12 mounted on the carriage 8, whereby the blank is carried around the arm 2, and radially-adjustable rotating blank-bearings 19, and blank-clamping devices 21.

20. In a welding mechanism, the vertical arm 3 carrying at its upper end a welding-roll 5, the vertical arm 2 carrying at its upper end the welding-roll 4, the vertically-adjustable carriage 8 movably mounted on the arm 3, the horizontally and circularly movable blank-carrying table 12 mounted on the carriage 8, whereby the blank is carried around the arm 2, and radially-adjustable rotating blank-bearings 19, and blank-clamping devices 21, hydraulic rams permitting the vertical adjustment of the carriage 8, and the auxiliary ram 9, substantially as and for the purposes set forth.

21. In a welding mechanism, the vertical arm 3 carrying at its upper end an adjustable welding-roll 5, and an adjustable welding device 24, the vertical arm 2 carrying at its upper end the fixed welding-roll 4, and the fixed welding device 23, the vertically-adjustable carriage 8 movably mounted on the arm 3, the horizontally and circularly movable blank-carrying table 12 mounted on the carriage 8, whereby the blank is carried around the arm 2, and radially-adjustable rotating blank-bearings 19, blank-clamping devices 21, hydraulic rams permitting the vertical adjustment of the carriage 8, and the auxiliary ram 9, substantially as and for the purposes above set forth.

THOMAS F. ROWLAND.

Witnesses:
WARREN E. HILL,
THOS. F. ROWLAND, Jr.